J. CALDWELL.
FRUIT PITTING MACHINE.
APPLICATION FILED JUNE 1, 1910.
1,075,547.
Patented Oct. 14, 1913.
3 SHEETS—SHEET 1.
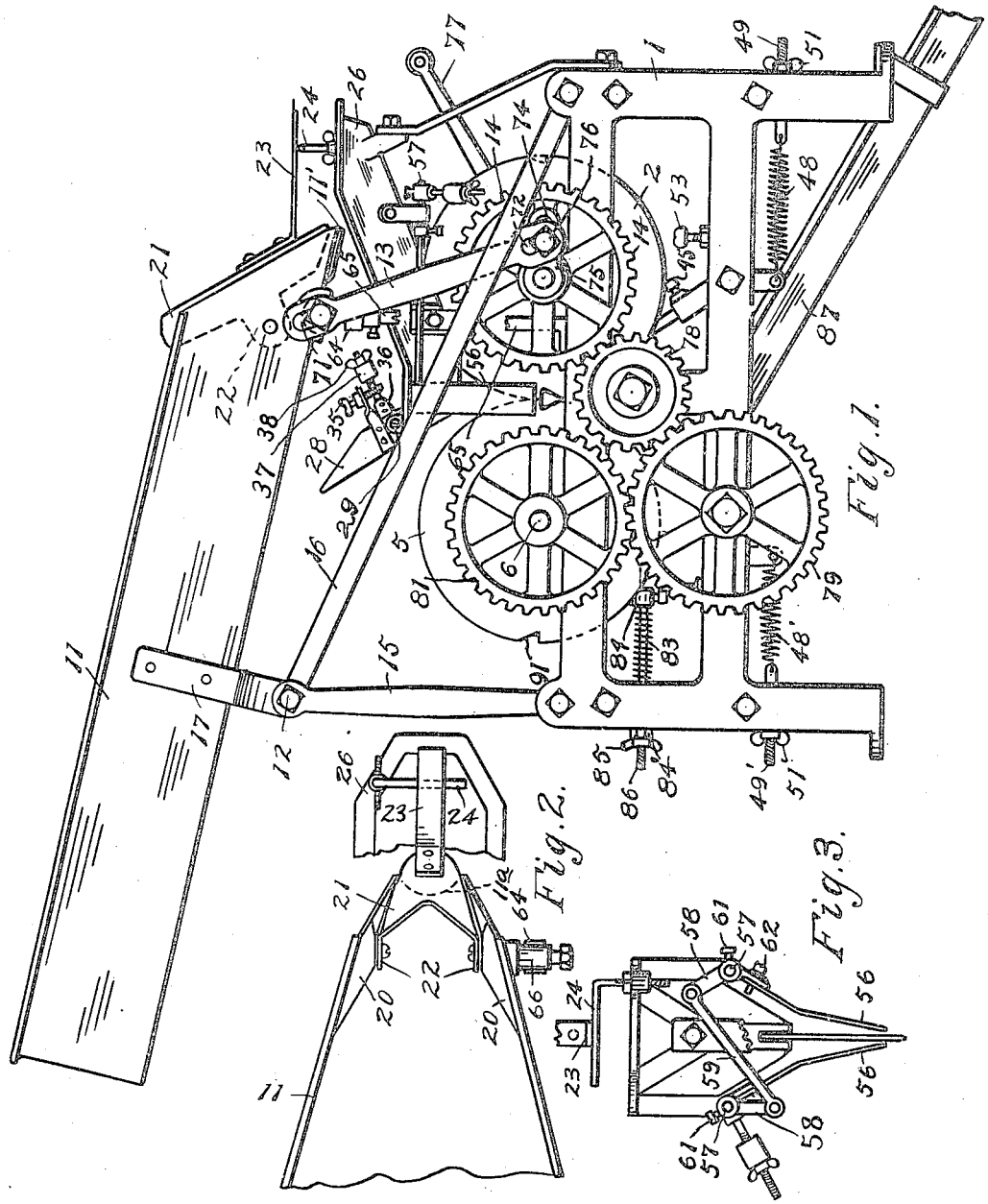

J. CALDWELL.
FRUIT PITTING MACHINE.
APPLICATION FILED JUNE 1, 1910.

1,075,547. Patented Oct. 14, 1913.

Witnesses:
N. H. Hunt,
Chas. Haley

Inventor:
Jerome Caldwell
By Albert H. Merrill
atty.

J. CALDWELL.
FRUIT PITTING MACHINE.
APPLICATION FILED JUNE 1, 1910.

1,075,547.

Patented Oct. 14, 1913.

3 SHEETS—SHEET 3.

Witnesses:
H. H. Hunt.
Chas. Haley

Inventor:
Jerome Caldwell
by Albert H. Merrill
Atty.

UNITED STATES PATENT OFFICE.

JEROME CALDWELL, OF LOS ANGELES, CALIFORNIA.

FRUIT-PITTING MACHINE.

1,075,547.   Specification of Letters Patent.   Patented Oct. 14, 1913.

Application filed June 1, 1910. Serial No. 564,516.

*To all whom it may concern:*

Be it known that I, JEROME CALDWELL, a citizen of the United States, residing at Los Angeles, California, have invented new and useful Improvements in Fruit-Pitting Machines, of which the following is a specification.

This invention relates to that class of fruit pitting machine in which the cutting disks engage different sides of the fruit and cut through the pulp to the pit, the pulp then being separated from the pit by spreading devices employed for that purpose.

This invention is an improvement upon the fruit pitting machine described in Patent Number 786,482 issued to me April 4, 1905.

Among the objects of the present invention are to improve upon the construction described in said patent by providing means to more effectively prevent clogging by tough unripe fruits becoming wedged between the cutting disks and resisting downward movement; to provide easily adjustable devices to control the relative position of the disks for stripping the pulp from the pits so as to accommodate the machine to various classes and conditions of fruit; to provide improved means for so guiding different sized fruits to the cutting disks as to cause the pulp to be split more nearly in equal halves, and in a lengthwise direction instead of crosswise of the pit; to provide improved means to clear the feed hopper from over-ripe fruit, and also improved means for removing the halved fruit from the cutting and spreading disks without mangling said fruit.

Figure 4:
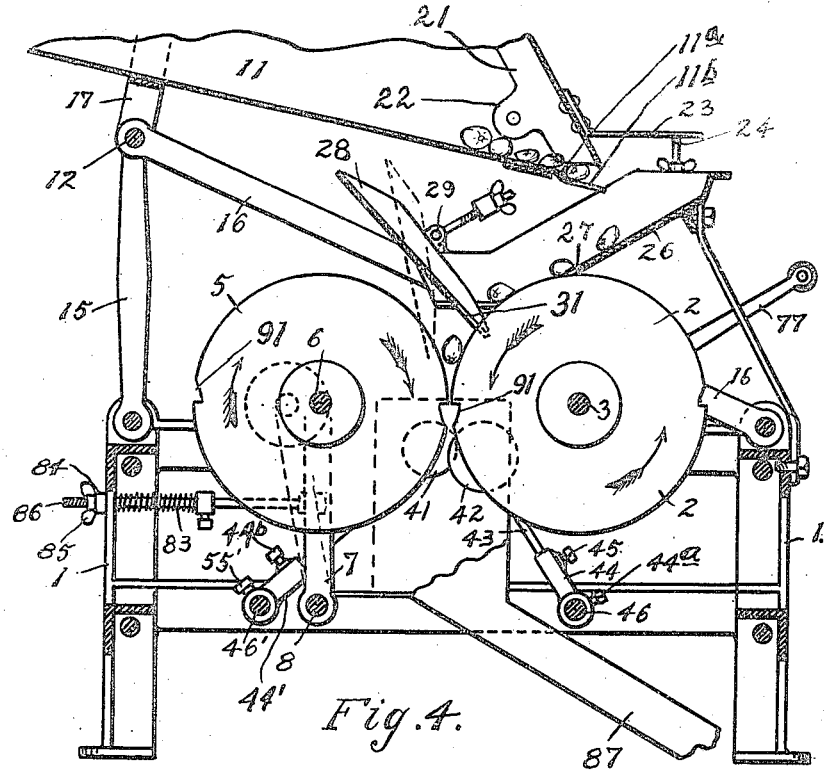
Figure 5:
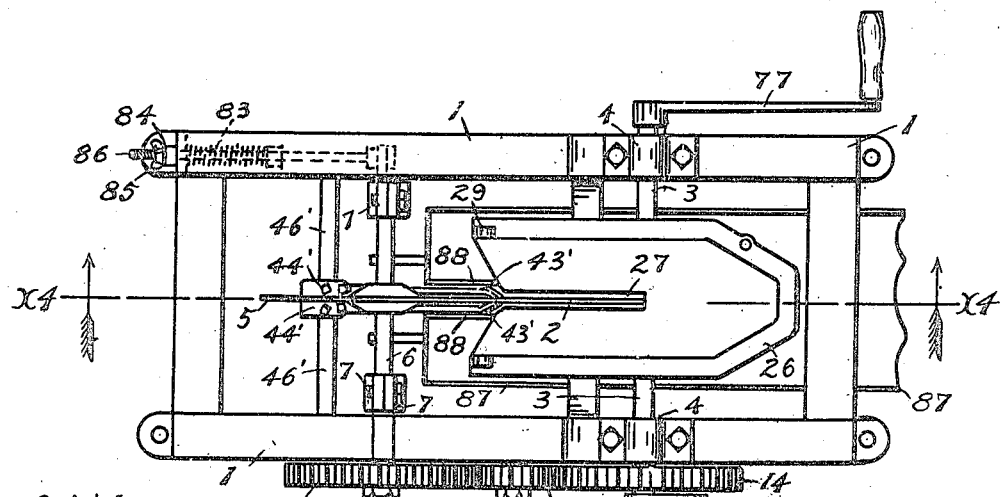
Figure 6:
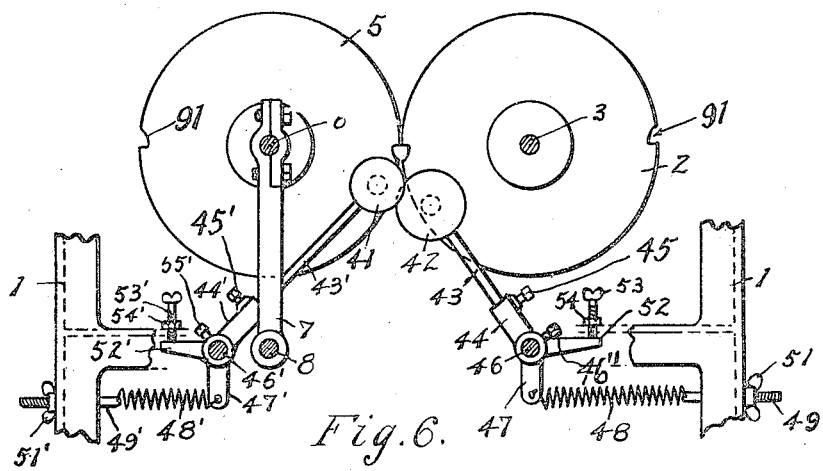
Figure 7:
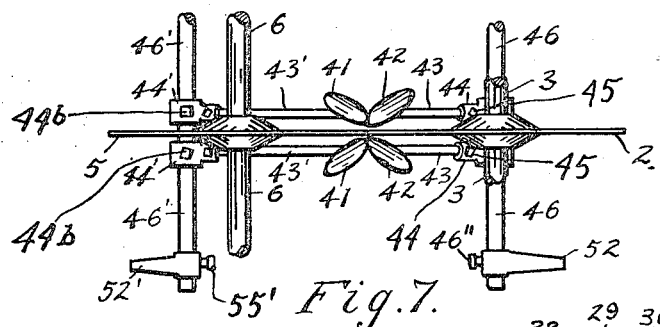
Figure 9:
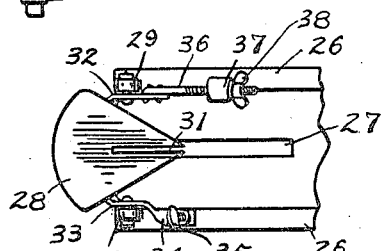
Figure 8:
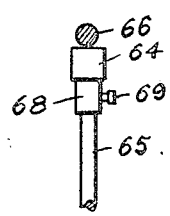

Referring to the accompanying drawings which illustrate the invention in the embodiment thereof at present considered the most desirable,—Figure 1 is a side elevation of the complete machine except that a portion of the discharge chute is broken away to contract the view. Fig. 2 is a broken plan view showing the discharge end of the hopper and the means for feeding the fruits singly therefrom. Fig. 3 is a rear elevation of the fingers for directing the fruits between the cutter disks, showing also the means to cause said fingers to move in unison toward and from the descending fruits. Fig. 4 is a longitudinal section on line $x^4$—$x^4$ of Fig. 5, a portion of the hopper and its supporting means being also shown. Fig. 5 is a plan view of the machine omitting the hopper and the supports thereof. Fig. 6 is a side elevation of the cutting and spreading disks, the means for supporting controlling and adjusting the spreading disks, being shown. Fig. 7 is a plan view of Fig. 6 omitting the portion of the frame shown in the latter view. Fig. 8 is a detailed view of an impact device to clear the hopper of over-ripe or soft fruit. Fig. 9 is a detailed plan view of the guiding device.

Referring in detail to the drawings, the general construction of the machine is similar to that described in my Patent Number 782,482 above referred to, there being a supporting frame 1 upon which is mounted a cutter disk 2 fixed to a shaft 3 supported by stationary bearings 4, and a bodily movable disk 5 mounted on a shaft 6 carried by arms 7 having their lower ends fixed to a rock shaft 8.

Referring now to the features relating to the present invention, the inclined hopper 11 is pivotally supported at 12, means being provided to oscillate said hopper in a vertical plane. Said means for oscillating the hopper may consist of a link 13 the upper end of which is pivotally secured to the lower or discharge end of the hopper, the other end of said link being eccentrically connected with a gear wheel 14 secured to the driving shaft 3.

The means for pivotally supporting the hopper may consist of a supplemental frame 15, mounted on the rear end of the machine and maintained in an upright position by means of braces 16. Metallic straps 17 may serve to connect the hopper to the frame 15 by means of pivots 12 already referred to.

The hopper is provided with a contracted discharge end which is reinforced by the hollow blocks 20 and is spanned by a feeding device 21 pivoted to swing in a vertical plane within the mouth of the hopper. Said device 21 is provided with downwardly extending limbs 22 which are pivoted to each side of the hopper near the bottom thereof. Said device desirably consists of a plate bent to form an inverted spout the nose of which is raised and lowered relatively to the bottom of the hopper to alternately intercept and release the fruits. To accomplish this operation said device 21 is provided with a forwardly extending arm 23 which is moved into and out of engagement with a stop 24 when the hopper is oscillated by link 13. Said stop 24, as best shown in Fig. 3, may consist of a bent arm the lower limb of which is adjustably secured to feeding chute 26 into which the hopper discharges. Said feeding chute 26 is desirably an inclined trough V-shaped in cross section and is provided with a longitudinal slot 27 which receives the upper edge of the cutting disk 2.

Adjacent the lower edge of the feeding chute 26 is a guiding member 28 which is pivoted at 29 above the discharge end of the chute to swing in a vertical plane toward and from the chute. Said pivoted member has slot 31 cut lengthwise into its lower end so that it may extend astride disk 2 and may also swing back astride disk 5 as indicated by dotted lines in Fig. 4. Normally said member will occupy the position shown in full lines in Fig. 4, unless otherwise adjusted; but whenever a fruit strikes said member it will swing back to the position shown in dotted lines carrying the fruit with it and placing it squarely between the cutting disks. As shown in detail in Fig. 9, said member 28 is provided with ears 32 and 33 for pivotally supporting the same, the ear 33 being located below the stop-arm 34 which carries a set screw 35, shown in Fig. 1, said set screw being adjustable so that the engagement of the end thereof with the feeding chute 26 will determine the swing of said member. Said member may also be provided with an angularly extending arm 36 carrying an adjustable weight 37 to regulate the opposition of said member to the descending fruits. Said weight 37 may have a screw threaded engagement with arm 36 and may be held in place by a thumb-nut 38.

In order to remove the pulp from the pits, I provide a small spreading disk 41 and a large spreading disk 42 on each side of the cutting disks. Spreading disks 42 are each carried by a revolubly adjustable arm 43 mounted in a socket 44 and held in adjusted position by a set screw 45. Said sockets 44 are each adjustably fixed to a rock shaft 46 by means of a set screw 44ᵃ. To said shaft 46, desirably near one end thereof, is adjustably secured by means of a set screw 46″, a casting having a downwardly extending arm 47 to the lower end of which is attached a tension spring 48 secured to a leg of the frame by means of a threaded pin 49 and thumb nut 51. In order to regulate the normal position of the disks 42 said casting may be provided with a stop arm 52 which operates against a set screw 53 working through a nut 54 on the frame. The set screws 53 and 53' constitute adjustable stops which coöperate with the arms 52 and 52' to hold the rotary spreading disks in a proper normal position to insure that they do their work well by removing all the pulp from the pits without impeding the downward movement of the pits any more than is necessary. The small spreading disks 41 may likewise be supported by revolubly adjustable arms 43' mounted in sockets 44'. Said sockets 44' are adjustably fixed to a rock shaft 46' by means of set screws 44ᵇ. To shaft 46' is secured a casting having a downwardly extending arm 47' to the lower end of which is attached a tension spring 48' secured to a leg of the frame by means of a threaded pin 49' and thumb nut 51'. In order to regulate the normal position of the disks 41 said casting may be provided with a stop arm 52' which operates against a set screw 53' working through a nut 54' on the frame. 55' is a set screw to hold said casting and its arms in fixed relation to shaft 46'.

This invention is an improvement over my former patent above referred to in respect to providing a pair of pendant fingers 56 to guide the descending fruits between the cutting disks. Said fingers automatically yield in unison from the descending fruits by reason of each finger being fixed to a rock shaft 57 said shafts being caused to rock in unison by the arrangement shown in Fig. 3. Referring to said figure each shaft 57 is provided with a radial arm 58, the free ends of said arms being pivotally connected by means of a link 59. Each of the fingers 56 is adjustably fixed to its shaft 57 by means of a set screw 61 and is also provided with a set screw 62 the end of which engages the side of the feeding chute. This latter is an important feature because it makes it possible to adjust the fingers to properly receive fruits of different sizes.

In order to give an impact to the hopper for the purpose of dislodging soft fruit therefrom, an elastic bumper 64 is adjustably mounted on the upper end of an arm or standard 65 in position to be struck by an extension 66 with which the hopper is provided. In order to provide for the vertical adjustment of said bumper the same is held by a socket 68 adjustably secured to the arm 65 by a set screw 69. This arrangement causes a more sudden jarring of the hopper than would be secured if the hopper were allowed to gradually decrease the speed of its descending movement until the crank arm 75 (see Fig. 1) reached dead center. The result is that the fruits are shaken loose when they begin to clog within the hopper.

The link 13 for oscillating the hopper is furnished with a slot 71 at its upper end. At its lower end said link has a plurality of holes 72 whereby it may be adjustably connected with the holes 74 of crank arm 75 by means of a bolt 76.

The bottom of the discharge end of the hopper has a semicircular recess or notch 11ᵃ and also a depressed portion 11ᵇ, this construction tending to cause the fruits, if of less width than length, to assume an edgewise position as they descend to the cutting disks. The main cutter disks can be rotated in reverse directions by means of a crank 77 fixed to the driving shaft 3. The driving gear 14 on said shaft, through idle gears 78 and 79, transmits a reverse rotation to gear 81, the latter gear being fixed to the shaft 6 to which the cutting disk 5 is fastened. The shaft 6 is carried by arms 7 held in normal position by a compression spring 83. The force of the tension spring 83 may be regulated by a set collar 84 and thumb nut 85 on the stem 86 around which said spring is coiled. 84' is a rubber bumper to modify the impact.

Beneath the machine is a discharge chute 87, the upper end of which has a central opening 88 (see Fig. 5) through which the pits may fall, the halves of the pulp being thrown into the chute on each side of said opening by the four oblique spreader disks.

The operation of the machine need not be described in detail, it being similar to that of the machine described in my former patent.

The two oppositely disposed notches 91 of each of the cutting disks are for the purpose of gripping the pits of tough unripe fruits which may occasionally enter the machine to clear the machine of the same. The disks are so geared as to cause the notches to descend together as shown with the straight sides of the notches uppermost.

I claim:

1. In a fruit pitting machine, the combination with a pair of reversely rotating cutting disks adapted to cut into opposite sides of descending fruits, of a pair of pendant fingers the free ends of which are adapted to guide fruits between said disks, means tending to move the free ends of said fingers toward said disks, means holding said fingers in fixed relation to each other, and adjustable means to limit the approach of one of said fingers toward said disks.

2. In a fruit pitting machine, a pair of reversely rotating cutting disks adapted to cut into opposite sides of descending fruits, a spreader disk inclined with relation to the path of said fruits, an arm having a rotary adjustment upon an axis extending lengthwise thereof, said arm also being pivoted and having an oscillatory movement on its pivot, and an adjustable stop to limit said oscillatory movement, said spreading disk being carried by the free end of said arm to encounter and separate the pulp from the descending fruits.

3. In a fruit-pitting machine, a pair of reversely rotating cutting disks adapted to cut into opposite sides of descending fruits, a spreader disk inclined with relation to the path of the descending fruits, a rock shaft, a socketed member carried by said shaft, and a supporting arm for said spreader disk, said arm being seated in and adapted to turn axially with respect to said socketed member to adjust said spreader disk.

4. In a fruit pitting machine, a pair of cutting disks, means for supporting and reversely rotating said disks to draw fruits downwardly therebetween, and a pivoted guiding member mounted to swing toward and from the discharge end of said chute and inclined in the reverse direction to the inclination of said chute to conduct the fruits squarely between said disks, said guiding member being centrally slitted to straddle said disks.

5. In a fruit pitting machine, a pair of coöperating cutting disks, means to support said disks and rotate the same in opposite directions to draw fruits downwardly therebetween, spreading devices on opposite sides of said disks to remove the pulp from the descending fruits, arms on which said spreading devices are mounted, a rock shaft to which said arms are fixed, a member fixed to said shaft, said member having an operating arm and a stop arm, a spring connected with said operating arm to yieldingly hold said spreading devices in the path of the descending fruits, and an adjustable stop screw against which said stop arm is normally held by said spring.

In testimony whereof I have hereunto signed my name in the presence of two subscribing witnesses at Los Angeles, in the county of Los Angeles and State of California, this 27th day of May, 1910.

JEROME CALDWELL.

Witnesses:
 ALBERT H. MERRILL,
 JOHN M. YORK.